United States Patent [19]

Fiorenza, II et al.

[11] Patent Number: 5,445,014

[45] Date of Patent: Aug. 29, 1995

[54] ELECTRONIC ENGINE LOAD AND REVOLUTION SENSING DEVICE

[75] Inventors: John A. Fiorenza, II, Slinger; Richard A. Dykstra, Cedar Grove; Joseph L. Pfaff, Brookfield; Scott L. Wesenberg, Hartland; Douglas Shears, Milwaukee, all of Wis.

[73] Assignee: Briggs & Stratton Corporation, Wauwatosa, Wis.

[21] Appl. No.: 289,907

[22] Filed: Aug. 12, 1994

[51] Int. Cl.$^6$ ............................................. G01L 3/26
[52] U.S. Cl. .............................. 73/117.3; 364/431.03
[58] Field of Search ............................ 73/116, 117.3; 364/431.03, 431.01, 431.4

[56] References Cited

U.S. PATENT DOCUMENTS

| | | | |
|---|---|---|---|
| 4,539,841 | 9/1985 | Schroeder et al. | 73/116 |
| 4,549,400 | 10/1985 | King | 60/394 |
| 5,047,943 | 9/1991 | Takahata et al. | 364/431.03 |
| 5,056,360 | 10/1991 | Dosdall et al. | 73/116 |
| 5,132,909 | 7/1992 | Schroeder et al. | 364/431.03 |
| 5,165,378 | 11/1992 | Miyashita | 73/117.3 |
| 5,237,504 | 8/1993 | Homles et al. | 364/431.04 |
| 5,337,240 | 8/1994 | Nakagawa et al. | 364/431.01 |

Primary Examiner—Richard E. Chilcot, Jr.
Assistant Examiner—Max H. Noori
Attorney, Agent, or Firm—Michael, Best & Friedrich

[57] ABSTRACT

The device automatically determines whether a load is being applied to the engine, and outputs a change signal that is used to change one or more engine operating parameters accordingly, such as engine speed, engine timing, or fuel flow. The load is sensed without using a manifold pressure or throttle plate position sensor, thereby reducing the cost of the system. The load is sensed by determining a period of a first crankshaft revolution, determining a period of the successive second crankshaft revolution, and computing a difference value that is a function of the difference between the first and second periods. Since the difference value is proportional to engine load, the difference values may be compared with a reference value to determine whether a load is being applied to the engine. The reference value may be preset, may be manually determined by the operator, or may be learned by the system's software. When the learning feature is used, the system is automatically mapped to the particular engine on which it is used.

33 Claims, 10 Drawing Sheets

——— NO-LOAD CONDITION
- - - - - FULL-LOAD CONDITION

ELECTRONIC ENGINE LOAD AND REVOLUTION SENSING DEVICE

BACKGROUND OF THE INVENTION

This invention relates to internal combustion engines. More particularly, this invention relates to engine systems which sense the load being applied to the engine and which change an operating parameter, such as engine speed, fuel flow, or ignition timing, in response to the sensed load.

Internal combustion engines are often used to power a load, such as a pressure washer, a power drill, a chain saw, or many other tools and devices. Engines are also used to supply power to generators, which in turn operate compressors, construction equipment, and the like.

When an engine is used to power a load, the load is often not operated continuously. For example, a power drill may be used intermittently, even though the engine continues to operate. It is generally desirable to have the engine running at a relatively high operating speed when the load is being applied to the engine. When the load is not being used, it is often desirable to reduce the engine speed or to change another engine operating parameter to reduce fuel consumption, lessen noise, and extend the life of the engine.

To sense whether the load is being applied to the engine, prior art devices typically use a manifold pressure sensor, a hall effect sensor, or some other device that generates a signal which is functionally related to the magnitude of the applied load. Often, two sensors are needed: one to sense manifold pressure and one to sense throttle plate position. A disadvantage of such prior art devices is that the requirement for these sensors increases the cost and complexity of the system. When a sensor fails, the additional expense of a replacement sensor and the system downtime increase the effective cost of the system.

FIG. 1 is a block diagram of a typical prior art system. As shown in FIG. 1, a control module 10 receives signals which are indicative of engine position, engine temperature, and manifold pressure or throttle plate position. The control module interprets the signals to change one or more engine operating parameters, such as ignition timing, fuel flow, or engine speed.

SUMMARY OF THE INVENTION

The present invention comprises a device that changes an operating parameter of an internal combustion engine, such as ignition timing, engine speed, or fuel flow, by sensing the load being applied to the engine without the need for any sensor other than a flywheel or crankshaft position sensor. The cost and complexity of the engine is thereby reduced.

The device according to the present invention includes a means for determining a first period functionally related to the duration of a first crankshaft revolution of the engine, and for determining a second period functionally related to the duration of a second, subsequent crankshaft revolution. The device includes a means for generating a difference value functionally related to the difference between the first period and the second period, a means for generating a reference value, and a means for generating a change signal for changing an operating parameter of the engine as a function of the difference value or if the difference value is not substantially equal to the reference value.

In a preferred embodiment, only difference values which are non-negative are used by the change signal generating means to generate a change signal.

In one embodiment, the operator of the device turns ON an on/off switch to activate the device. When the switch is turned ON, a sampling means samples and stores a difference value as the reference value. Assuming that the operator has turned ON the on/off switch when no load was being applied to the engine, the reference value then is approximately equal to a value functionally related to a no load condition. Thereafter, the change signal generating means changes an operating parameter, such as increasing the engine speed, when the difference value being used by the change signal generating means is not substantially equal to the stored reference value. In this way, the reference value and thus the engine idle speed is customized to the particular system incorporating the device of the present invention.

In a preferred embodiment of the present invention, the device also includes a means for changing the reference value. This reference value change means may comprise a means for storing a plurality of successive difference values, and a means for averaging the stored difference Values to compute a new reference value. In this way, the device according to the present invention "learns" what the reference value should be, thereby adjusting the operation of the engine to accommodate changes due to engine warm up, engine wear, and other variables.

In another embodiment of the invention, the operator may manually input a first reference value functionally related to the engine idle speed, and a second reference value functionally related to the engine running speed. When the system is in operations, the engine speed, or another engine operating parameter, will be changed if the load is not being applied and the engine speed is relatively high; the selected operating parameter will also be changed when the load is being applied and the engine speed is relatively low. This embodiment also enables the device to be customized to the particular application.

Instead of comparing the difference value with a reference value, the difference value, or the average difference value, may be used as an input to a map or look-up table. The look-up table may be used to generate a change signal to change the engine speed as a function of the difference value or the average difference value.

It is a feature and advantage of the present invention to provide an engine load sensing device that does not require a manifold pressure or throttle plate position sensor.

It is yet another feature and advantage of the present invention to reduce the cost and complexity of engine idle down devices.

It is yet another feature and advantage of the present invention to provide an engine idle down device that is adaptable to the specific application without any additional specialized hardware components or software programming.

These and other features of the present invention will be apparent to those skilled in the art from the following detailed description of the preferred embodiments and the drawings, in which:

BRIEF DESCRIPTION OF THE DRAWINGS

The flowchart in FIG. 10 (a) depicts a first version of the software. The flowchart in FIG. 10 (b) depicts a second version of the software. FIG. 10(c) depicts a variation of the software program depicted in FIG. 10(b).

DETAILED DESCRIPTION OF THE INVENTION

The present invention is particularly suitable for four-cycle engines in which two revolutions of an engine crankshaft comprise a single cycle of the engine. In such engines, the fuel is ignited in a combustion chamber during only one of the crankshaft revolutions of each engine cycle. As used herein, the term "crankshaft revolution" refers to one complete, 360° revolution of an engine crankshaft, regardless of the starting point of the crankshaft revolution.

In prior art devices, the starting point of a crankshaft revolution may be determined by a sensor such as a hall effect sensor. In the present invention, it is convenient to mark the beginning and end of a crankshaft revolution by the generating of a negative-going ignition pulse; however, it is understood that any other starting point may be used. Although the fuel is ignited during only one crankshaft revolution of each engine cycle, many engines are designed to generate an ignition pulse during each crankshaft revolution. For purposes of the description herein, it is assumed that an ignition pulse is generated during each crankshaft revolution.

It has been found that the magnitude of a load being applied to an engine is proportional to the time difference between a first period of a first crankshaft revolution and a second period of a subsequent, successive period of a crankshaft revolution. To calculate the magnitude of the load, the duration of a first crankshaft revolution is determined, the duration of a second crankshaft revolution is determined, and the difference between these two time durations is determined to yield a difference value. As the load increases, the absolute value of the difference value also increases. Therefore, the difference value may be compared with a reference value to determine whether a load is being applied to the engine and to adjust the engine speed or another operating parameter accordingly. The theory underlying the invention is more fully discussed below in connection with the improved technique.

An improvement to this technique is to only use the difference values which are positive to determine whether a load is being applied to the engine. This improvement is discussed below in connection with FIGS. 5 through 8 and FIGS. 11 and 12.

Figure 1:
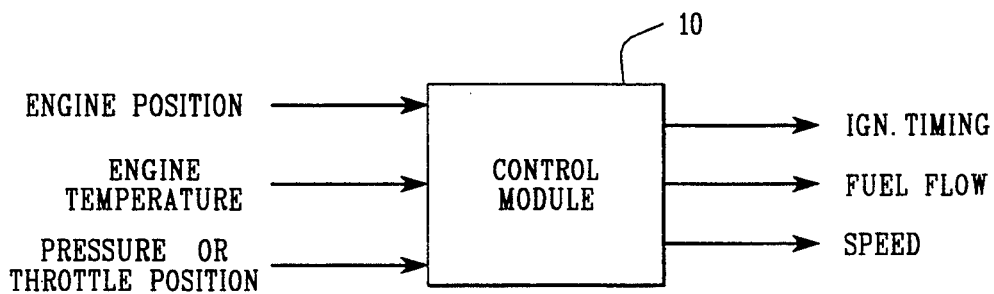
FIG. 1 is a block diagram of a prior art engine control system.

The primary advantage of using these techniques is the elimination of one or more sensors that are required in prior art devices. As discussed above in connection with FIG. 1, a typical prior art control system included an engine position sensor, an engine temperature sensor, and either a manifold pressure (MAP) sensor or a throttle plate position sensor.

Figure 2:
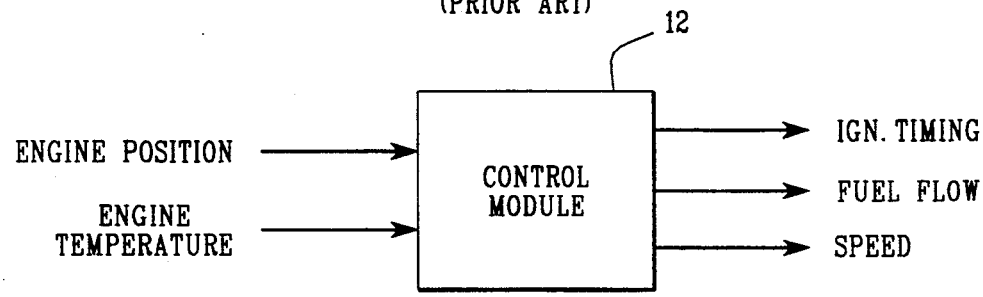
FIG. 2 is a block diagram of an engine control system according to the present invention.

A control system according to the present invention is depicted in FIG. 2. In FIG. 2, control module 12 only requires an engine position sensor and an engine temperature sensor to provide input signals that control ignition timing, fuel flow, or engine speed. Thus, the manifold pressure sensor or the throttle plate position sensor is eliminated, thereby reducing the cost and complexity of the control system.

Figure 3:
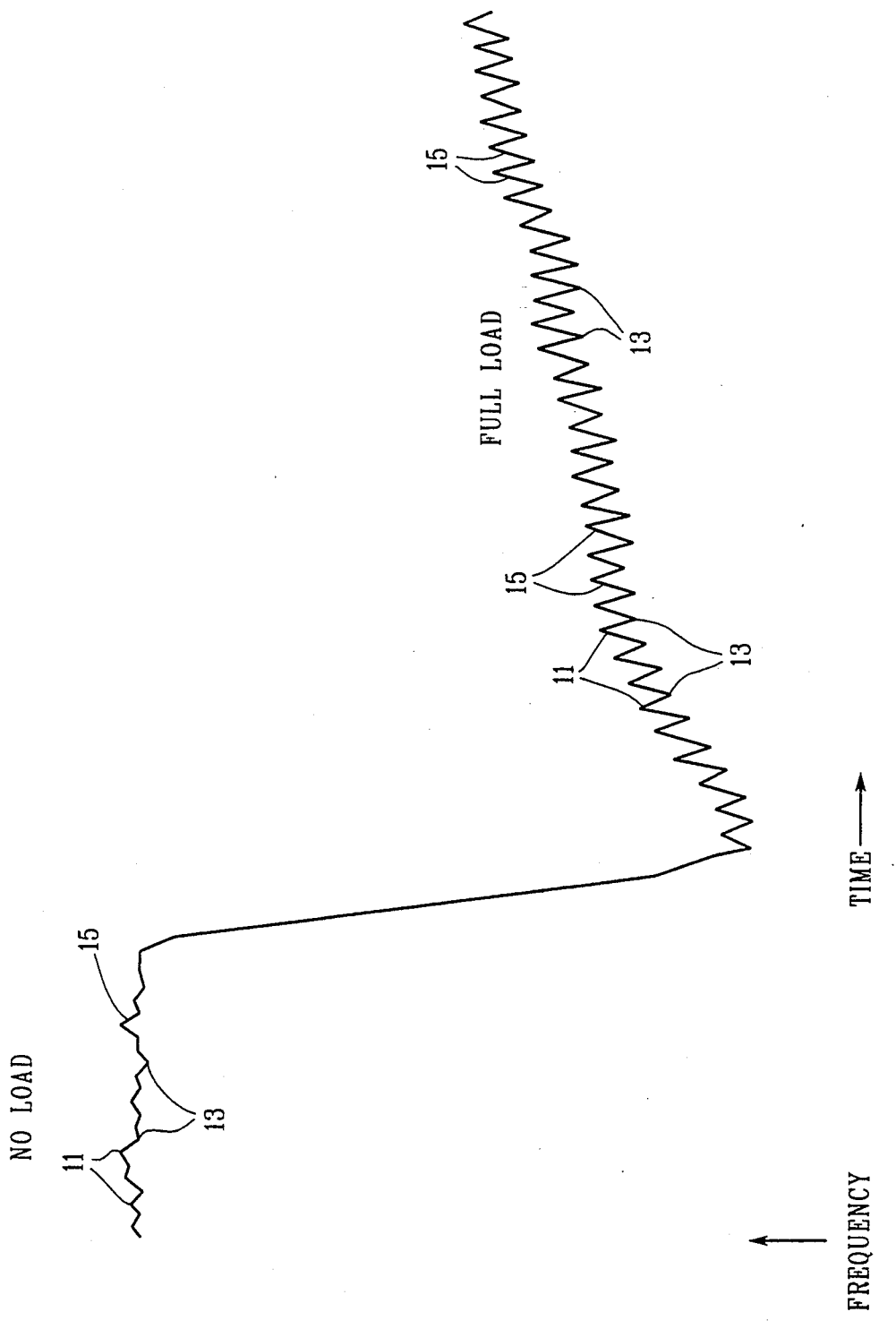
FIG. 3 is a graph of frequency versus time which depicts the change in frequency and the change in the periods of crankshaft revolution when a load is applied to the engine.
Figure 4:
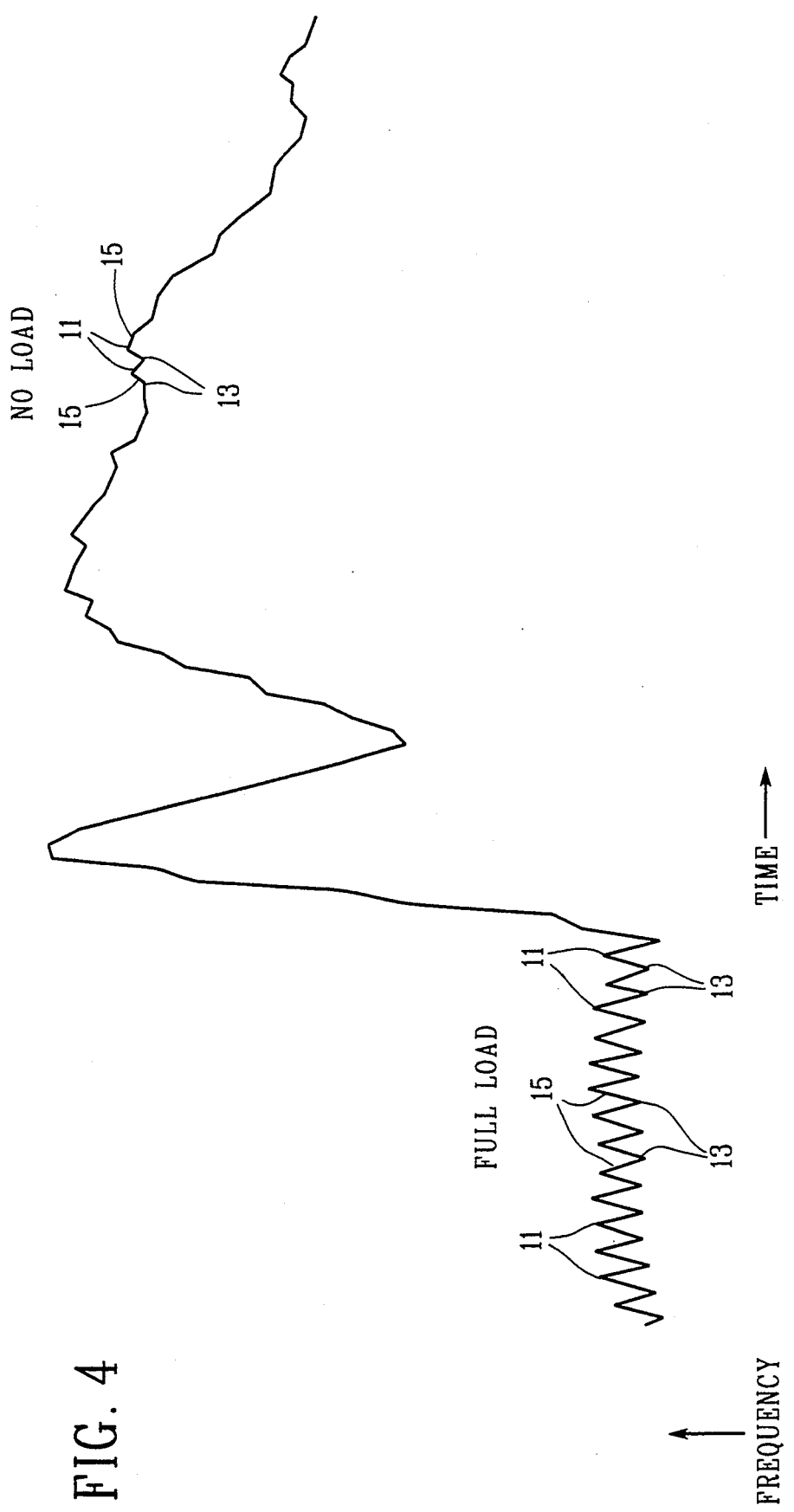
FIG. 4 is a frequency versus time graph depicting the change in engine frequency and the change in the periods of crankshaft revolution when a load is removed from the engine.

FIGS. 3 and 4 are frequency versus time diagrams that may typically be generated using a system according to the present invention. In FIG. 3, the lefthand side of the graph depicts the output during a no load condition. Thereafter, the frequency (which is functionally related to engine speed) drops dramatically when a load is applied to the engine. This drop is referred to as "undershoot". After a brief period of time, the engine governor raises the engine speed to the normal governed speed despite the fact that a load is being applied to the engine.

FIG. 4 depicts the opposite situation, in which a load is first applied to the engine and is then removed, resulting in a momentary increase in the engine speed called "overshoot". Thereafter, the engine governor reduces the engine speed to a governed speed.

In both FIGS. 3 and 4, the speeds of the engine crankshaft revolutions vs. time have been plotted, calculated by taking the inverse of the period for one revolution. Each data point in FIGS. 3 and 4 represents the speed of one revolution. The plot of the first and second speeds of each engine cycle yields a substantially jagged or sawtooth-type of graph. Each of the upper points 11 corresponds to a first speed or timed relation of a first crankshaft revolution in an engine cycle. The next, lower points 13 correspond to the subsequent speeds of a second crankshaft revolution. The line 15 connecting adjacent points 11 and 13 is functionally related to the time difference, or difference value, between the first period of the first crankshaft revolution and the second period of the second crankshaft revolution. As shown in FIGS. 3 and 4, this difference value is relatively small under no load conditions, but increases substantially under full load conditions. Thus, the difference value is proportional to the load being applied to the engine. This proportional relationship between the difference value and the engine load is used in the present invention to eliminate the additional sensors discussed above and to change an engine operating parameter based upon the sensed load.

Besides being used to determine whether a load is being applied to the engine, the present invention also determines the period of each crankshaft revolution and compares successive periods to achieve a difference value. The periods of crankshaft revolution may also be used to control engine timing, fuel flow, engine speed, or other operating parameters of the engine.

Figure 9:
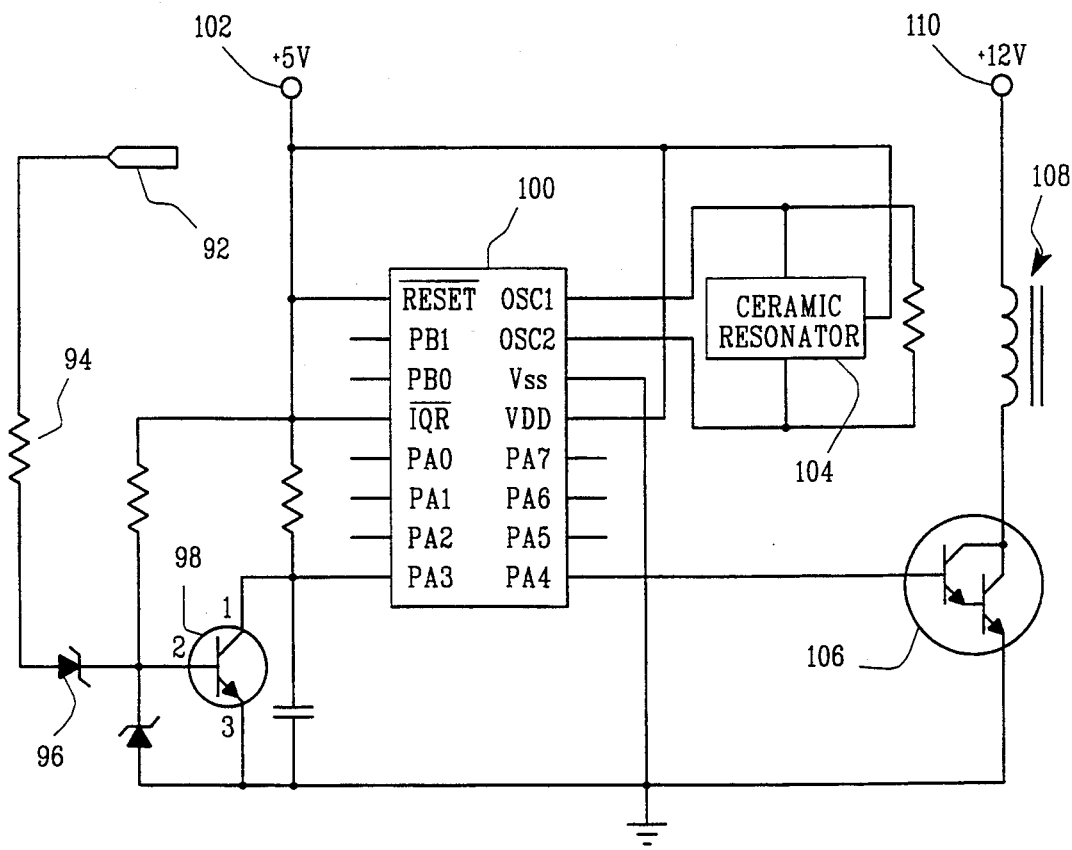
FIG. 9 is a schematic diagram of a microprocessor-controlled embodiment of the present invention.

FIG. 9 is a schematic diagram of a microprocessor-controlled embodiment of the present invention. In FIG. 9, a negative-going ignition pulse is input at line 92. This pulse is filtered by a resistor 94 and a zener diode 96, and turns off transistor 98. Transistor 98 is connected to pin PA3 of a microprocessor 100. Microprocessor 100 is preferably a Motorola model no. MC68HC05K1 controller. Pin PA3 is also connected to a 5 volt power supply 102 through a pull-up resistor. When transistor 98 is turned OFF, pin PA3 goes to a high state. An oscillator 104 provides the timing signal for microprocessor 100.

Microprocessor 100 determines the period of a crankshaft revolution by measuring the time between successive high state pulses at pin PA3. Microprocessor 100 then subtracts the periods of two successive crankshaft revolutions to compute the difference value. When the difference value is less than a reference value, a positive voltage pulse is applied to pin PA4 to turn ON a Darlington transistor 106. The turning ON of transistor 106 indicates that the speed of the engine should be reduced to an idle speed since the engine is in a no load condition. The turning ON of transistor 106 energizes an electromagnet 108 which is connected to a 12 volt power source 110. When electromagnet 108 is energized, a governor lever arm of the engine's governor is magnetically attracted toward electromagnet 108, thereby overriding the governor and reducing the engine speed to an idle speed.

The system depicted in FIG. 9 may be used with a predetermined reference value with which the difference value is compared, with operator-selected reference value(s), or the system may have a learning mode in which the reference value is obtained or changed by the microprocessor software. In the learning mode, the reference value may comprise a running average of the absolute values of the difference values, for the embodiment described in connection with FIGS. 10(b) through 10(c), so that the system is mapped to the particular engine on which it is being used. For the embodiment described in connection with FIGS. 11 and 12, the reference value in the learning mode may comprise a running average of the non-negative difference values.

Figure 10C:
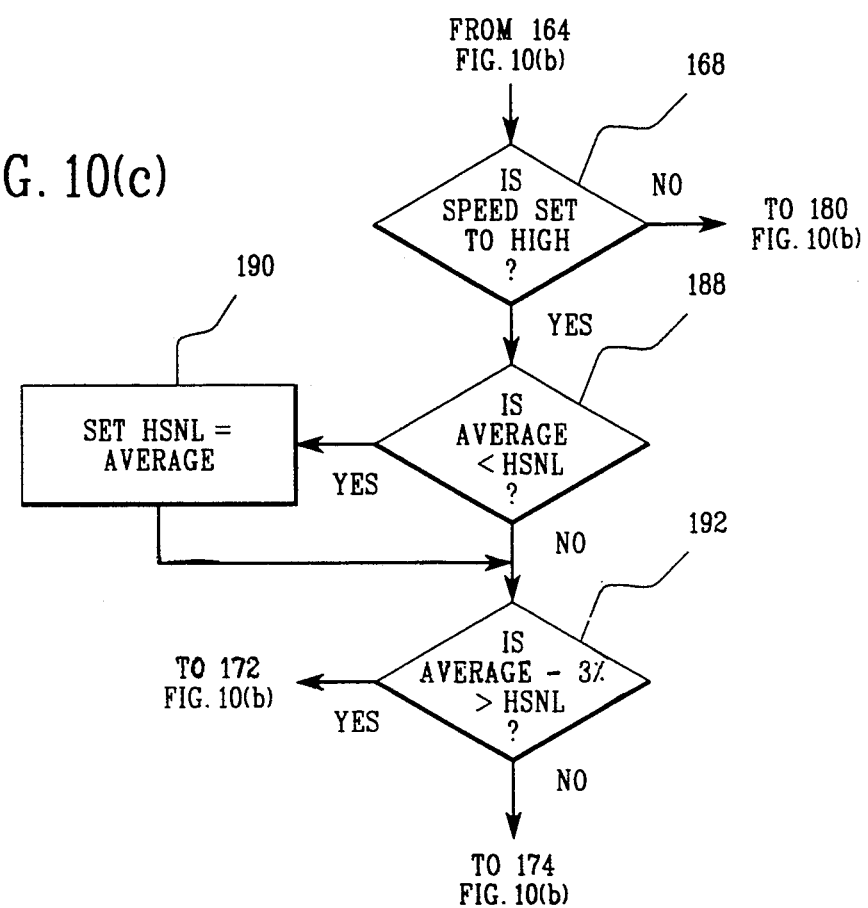
FIGS. 10(a) through 10(c) are software flowcharts of the software used to operate the microprocessor in FIG. 9 wherein the absolute values of both the positive and the negative difference values are used.
Figure 10A:
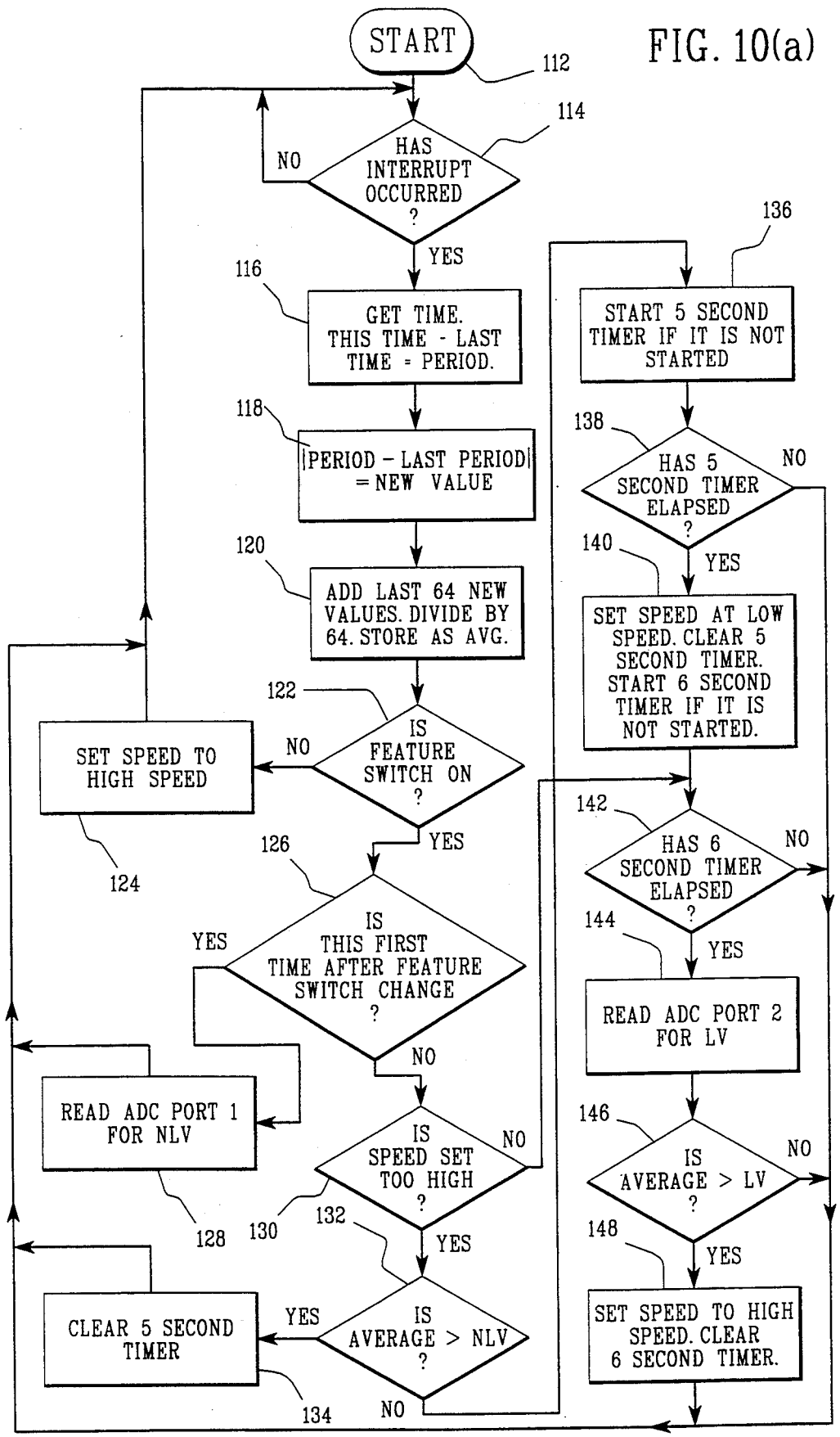
Figure 10B:
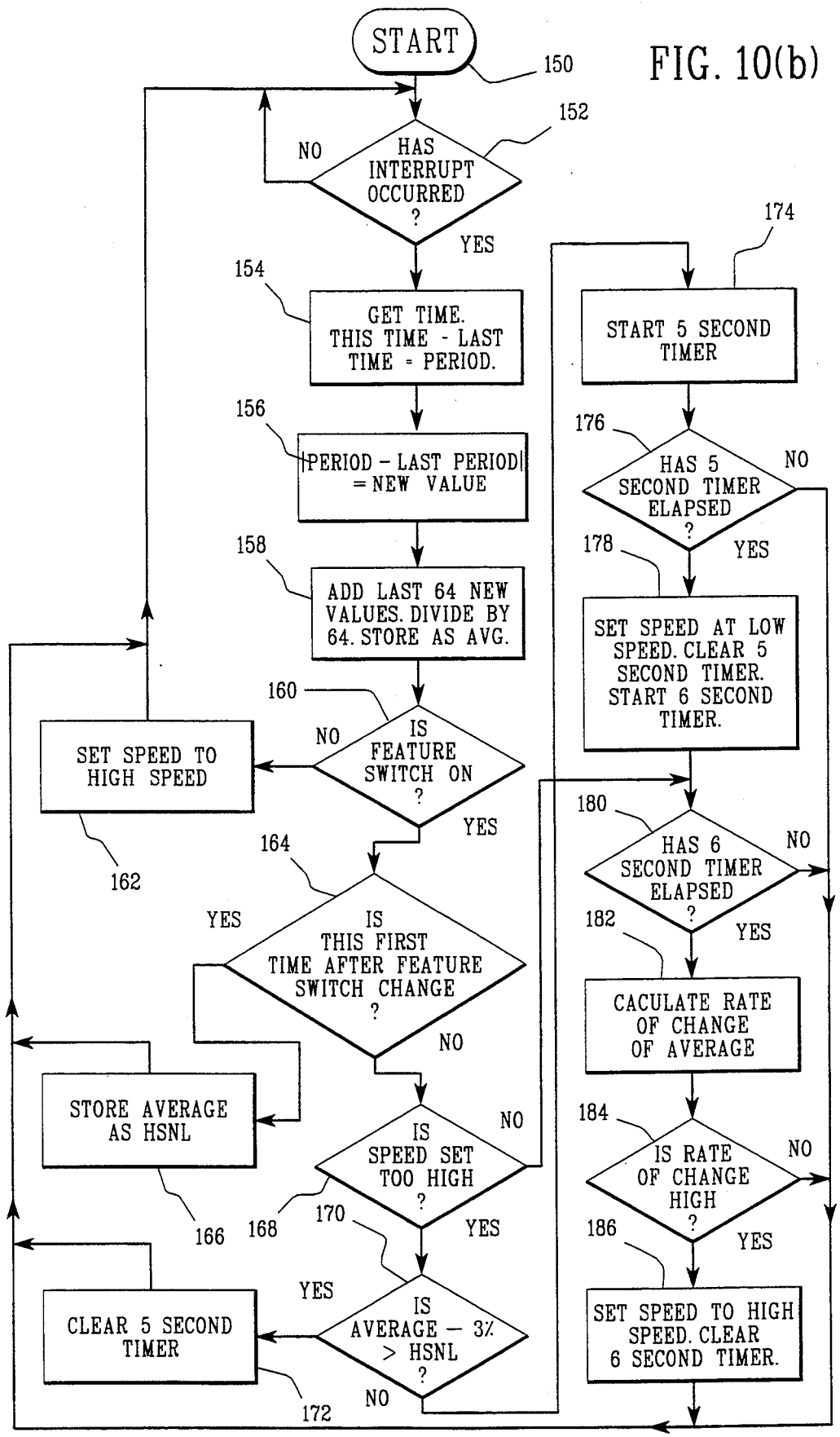

]FIGS. 10(a) through 10(c) comprise flowcharts of several embodiments of software that may be used to operate microprocessor 100 of FIG. 9. The software depicted in FIG. 10(a) assumes that manually-operated potentiometers are used to set the reference values. The operator sets the potentiometers to input the no-load and load values of the reference value. An analog to digital converter is used to convert the analog output of the potentiometers to a digital signal that is input to microprocessor 100. The running average of the absolute values of the difference values over 64 engine cycles is then compared with the operator-selected no-load and load reference values to determine whether the engine speed should be changed.

Referring specifically to FIG. 10(a), after the program starts at Step 112, a determination is made at Step 114 whether an ignition firing or interrupt has occurred. If no interrupt has occurred, the program waits until an interrupt has occurred. If the answer is Yes at Step 114, the time of the interrupt is obtained at Step 116 and the value corresponding to the time of the last interrupt is subtracted from the time of the most recent interrupt. The difference of these two times equals the period of the crankshaft revolution, which is stored as a variable called PERIOD. At Step 118, the value of the last PERIOD is subtracted from the value of the present PERIOD, and the absolute value of this difference is determined to obtain a NEW VALUE. By using the absolute value of each difference value, the magnitudes of all difference values—both positive and negative—are used to determine the variable NEW VALUE. At Step 120, the last 64 NEW VALUES are added and divided by 64 to obtain a running average of the difference values. This average is stored under a variable called AVERAGE.

At Step 122, a determination is made whether the on/off feature switch is turned ON. The feature switch is a manually-operated switch which must be ON for the device according to the present invention to be activated. If the feature switch is not ON as determined at Step 122, the speed of the engine is set to a high speed at Step 124 to insure that the engine is always running at high speed if the feature switch is OFF. The software then returns to Step 114.

If the answer at Step 122 is Yes, a determination is made at Step 126 whether this is the first time the software has run after the feature switch has changed state. If the answer at Step 126 is Yes, it is assumed that the engine is in the no-load condition since the operator normally would not turn the feature switch ON for the first time if a load was being applied to the engine. The software then proceeds to Step 128, wherein the value at port 1 of the analog to digital converter (ADC) is read and is stored as the no-load value NLV. The program then returns to Step 114 to await the next ignition firing.

If the determination at Step 126 is No, a determination is made at Step 130 whether the engine speed is set to a high speed. If the answer at Step 130 is Yes, a determination is made at Step 132 whether the AVERAGE value is greater than the no-load value NLV. A Yes answer at Step 132 indicates that a load is being applied to the engine. Since the speed has been determined to be high at Step 130, no speed adjustment should be made if a load is being applied to the engine. Thus, the program proceeds to Step 134, at which a five second timer is cleared. The software then returns to Step 114 and awaits another ignition firing.

If the answer at Step 132 is No, a five second timer is started at Step 136 if the timer has not been running. The purpose of the timer is to prevent unnecessary cycling between high and low engine speeds if the load is being intermittently applied. A determination is then made at Step 138 whether the five second timer has timed out. If the answer is No, the program returns to Step 114. If the five second timer has timed out, the engine speed is set to the low speed at Step 140, the five second timer is cleared, and a six second timer is started. For the program to reach Step 140, the speed must be set to a high speed at Step 130, and the average of the absolute values of the difference values must be less than or equal to the no-load value NLV (Step 132). This situation indicates that no load is being applied, even though the speed has been set to the high speed. Thus, the speed is reduced at Step 140.

At Step 142, a determination is made whether the six second timer has timed out. If the answer is No, the program returns to Step 114. If the answer at Step 142 is Yes, port 2 of analog to digital converter ADC is read at Step 144 to obtain the load value LV. A determination is then made at Step 146 whether the AVERAGE value is greater than the load value LV. If the AVERAGE value is greater than the load value LV, a load is being applied to the engine. Thus, the engine speed is set to high speed at Step 148 and the six second timer is cleared. The program then returns to Step 114. If the AVERAGE value is less than or equal to the load value LV, the program returns to Step 114 since no adjustment is to be made to the engine speed.

FIG. 10(b) is a flowchart of a second version of the software in which the reference value is automatically learned by the system.

Referring to FIG. 10(b), the software begins to run at Step 150. A determination is then made at Step 152 whether an ignition firing or interrupt has occurred. If no interrupt is detected, the system waits until an interrupt occurs. Once an interrupt occurs, the time of the interrupt is obtained at Step 154 and is stored under the variable TIME. The period of the last crankshaft revolution is then calculated by subtracting the prior value of the time variable from the most recent value of the time variable. The resulting value is stored under the PERIOD variable.

The NEW VALUE, corresponding to the absolute value of the difference value, is calculated by subtracting the most recent PERIOD value from the prior PERIOD value and taking the absolute value at Step 156. At Step 158, the last 64 NEW VALUES are averaged, with the result being stored under the AVERAGE variable. At Step 160, a determination is made whether the feature switch is ON. If the answer at Step 160 is No, the engine speed is set to the high speed at Step 162. If the answer at Step 160 is Yes, a determination is made at Step 164 whether this is the first time the software has run after the feature switch has changed state. If the answer at Step 164 is Yes, the high speed no-load value HSNL is set to be equal to the AVERAGE value at Step 166 since it is assumed that no load is being applied to the engine.

If the answer at Step 164 is No, a determination is made at Step 168 whether the engine speed is set to the high speed. If the answer at Step 168 is No, a determination is made at Step 180 whether a 6 second timer has elapsed. If the answer at Step 180 is No, the program returns to Step 152. If the answer at Step 168 is Yes, a determination is made at Step 170 whether the AVERAGE value minus 3% is greater than the reference value HSNL. If the AVERAGE value minus 3% of the AVERAGE value is greater than the HSNL value, this indicates that a load has been applied to the engine. The five second timer is then cleared at Step 172 and the program then returns to Step 152.

If the answer at Step 170 is No, this indicates that the AVERAGE value is less than or approximately equal to the reference value HSNL. This circumstance indicates that no load is being applied to the engine. The program then proceeds to Step 174, wherein a five second timer is started, if it has not already been started. At Step 176, a determination is made whether the five second timer has timed out. If the answer at Step 176 is No, the program returns to Step 152. If the answer at Step 176 is Yes, the engine speed is set to low speed at Step 178. That is, the engine is idled down since no load is being applied to the engine. Also at Step 178, the five second timer is cleared and a six second timer is started, if it has not already been running.

At Step 180 a determination is made whether the six second timer has elapsed. The purpose of the six second timer is to delay the operation at Step 182 until the engine has decelerated and come to a steady idle down speed. If the answer at Step 180 is No, the program returns to Step 152. If the answer at Step 180 is Yes, the rate of change of the AVERAGE value is calculated at Step 182. The purpose of this calculation is to determine whether a load has been applied to the engine. When a load is applied, the AVERAGE value of the periods increases sharply, and may be used as an indication of load application.

A determination is then made at Step 184 whether the rate of change of the AVERAGE value is high. If the answer at Step 184 is No, the program returns to Step 152. If the answer at Step 184 is Yes, the engine speed is set to high speed and the six second timer is cleared at Step 186. It is desirable to have the engine set to a high speed when loads are applied to the engine. After Step 186, the program returns to Step 152 to await the next negative-going ignition pulse.

FIG. 10(c) depicts a software modification to the program outlined in FIG. 10(b). The purpose of this modification is to accommodate changes in the HSNL reference value as the engine warms up. As an engine warms up, it becomes more efficient, thereby making it desirable to change reference value HSNL. The steps in FIG. 10(c) replace Steps 168 and 170 of FIG. 10(b).

In FIG. 10(c), a determination is made at Step 168 whether the engine speed is set to HIGH. If the answer at Step 168 is Yes, a determination is made at Step 188 whether the AVERAGE value is less than reference value HSNL. If the answer at Step 188 is Yes, reference value HSNL is set equal to the AVERAGE value at Step 190. If the answer at Step 188 is No, or if Step 190 has already been accomplished, a determination is made at Step 192 whether the AVERAGE value minus 3% of the AVERAGE value is greater than the reference value HSNL. The sequence of the program is then the same as the sequence following Step 170 in FIG. 10(b).

Through testing, the inventors have discovered an improvement to the above-described technique for engine load sensing. In the above-described technique, every difference value is used to determine whether a load is being applied to the device. The absolute value of the difference values are obtained since some of the difference values are negative. In the improvement discussed below, only the positive difference values are used to determine engine load, without taking the absolute value of any of the difference values.

A brief discussion of the theory underlying the present invention will assist in understanding why the improvement yields better results.

As discussed above, one complete engine cycle of a four-cycle engine includes two complete revolutions of the crankshaft. During one of these revolutions, called the "combustion revolution", engine combustion actually occurs. During the other crankshaft revolution, called the "non-combustion revolution", no combustion occurs. The duration or period of the combustion revolution will always be less than the duration or period of the non-combustion revolution because the combustion process increases the speed of crankshaft rotation during the combustion revolution. The non-combustion revolution has a longer period due to the effects of parasitic load, the external or applied load to the engine, and the lack of mechanical energy input from the piston and connecting rod that results from the combustion of fuel.

In addition to being determined by the components of combustion, the period of the combustion revolution is also in part determined by the load applied to the engine and the inertia of the moving components. Since the period of the non-combustion revolution is primarily determined by the load and inertia-related components of engine dynamics, it is more directly dependent upon the external load applied to the engine than the period of the combustion revolution. As the magnitude of the external load applied to the engine increases, the load component is also increased, resulting in a longer period for the non-combustion revolution. As a result, the time difference between the completion of successive engine periods will be increased when the externally-applied load is increased.

To determine the time difference between successive periods of crankshaft revolution, it is apparent that the period of the non-combustion revolution may be subtracted from the period of the combustion revolution, or that the period of the combustion revolution may be subtracted from the period of the non-combustion revolution. One of these sets of calculations will yield a negative value, whereas the other will yield a positive value. In the technique described above in connection with FIGS. 10 (a) through 10 (c), the negative signs of the negative values were eliminated by obtaining the absolute value of each of the time differences. In this way, the magnitude of each of the time differences is used to determine the difference value.

The inventors have discovered, however, that the magnitude of the positive time differences between successive periods yields a better representation of applied load. When the difference value is positive, the shorter current period of the combustion revolution is being subtracted from the longer period of the previous non-combustion revolution. These positive time difference values correspond to the negative slopes of the sawtoothed curves depicted in FIGS. 3, 4 and 11. These curves are time versus speed or frequency curves, with the frequency being the inverse of the period. A positive value for the time difference will result in a negative slope in the frequency versus time/speed curves.

Figure 11:
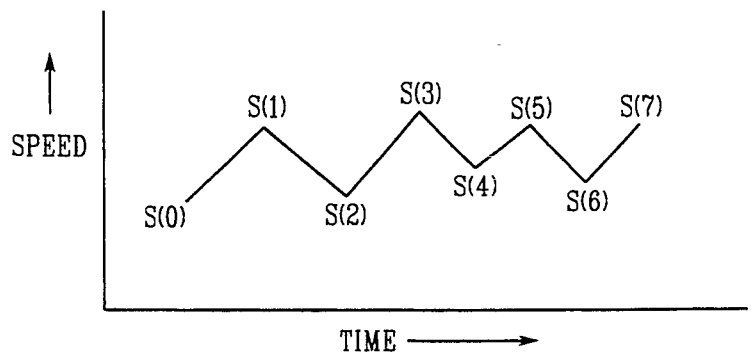
FIG. 11 is a speed versus time graph depicting eight data sample points S(0) through S(7), each sample point representing the speed of a crankshaft revolution.
Figure 12:
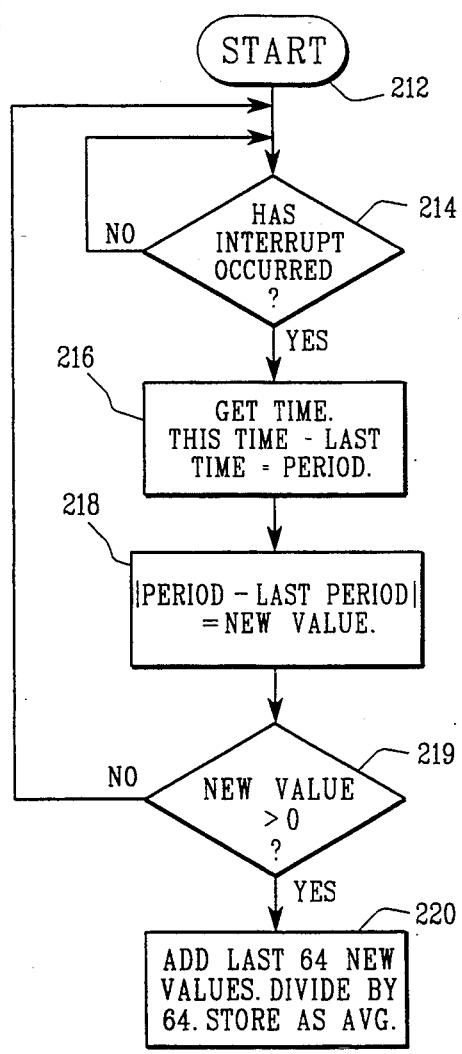
FIG. 12 is a software flowchart modification to FIGS. 10(a) and 10(b) depicting the steps needed to implement the improved technique that uses non-negative time differences only.

The above-described improvement is better understood with reference to FIGS. 11 and 12.

In FIG. 11, eight speed sample points S(0) through S(7) are depicted in the sawtooth curve. Only those speed differences between the speeds for successive crankshaft revolutions that result in negative slopes are used to determine the load. Thus, the period corresponding to point S(2) minus the period corresponding to speed point S(1) results in a positive difference value. Similarly, the period corresponding to speed point S(4) minus the period corresponding to speed point S(3) results in a positive difference value. Likewise, the period corresponding to point S(6) minus the period corresponding to point S(5) results in a positive difference value. These three positive difference values are used in the improved technique to determine the engine load. The time differences in FIG. 11 which are not used in the improved technique but are used in the technique described in connection with FIGS. 10 (a) through 10 (c) correspond to the periods of S(1) minus S(0), S(3) minus S(2), S(5) minus S(4), and the period of S(7) minus the period of S(6).

FIG. 12 is a software flowchart modification to the flowcharts depicted in FIGS. 10 (a) and 10 (b) used to implement the improved technique described herein. Steps 212 through 220 in FIG. 12 replace Steps 112 through 120 in FIG. 10 (a). Steps 212 through 220 in FIG. 12 replace steps 150 through 158 in FIG. 10 (b). All the remaining steps remain the same.

Referring now to FIG. 12, the program is started at Step 212. At Step 214, a determination is made whether engine ignition or another interrupt has occurred. If the answer at Step 214 is No, the program loops back until an interrupt occurs. If the answer at Step 214 is Yes, the time of the interrupt is obtained at Step 216. Also at Step 216, the time of the last interrupt—stored as LAST TIME—is subtracted from the time of the present interrupt—called THIS TIME—to determine the value of the variable PERIOD.

At Step 218, the value stored as LAST PERIOD is subtracted from the value of the present PERIOD to obtain the value of the variable NEW VALUE. Note that the absolute value is not determined in Step 218, as had been determined in Step 118 (FIG. 10(a)).

At Step 219 in FIG. 12, a determination is made as to whether the NEW VALUE is greater than zero. If the answer at Step 219 is No, the program loops back to Start since a NEW VALUE which is negative is not used in the improved technique.

If the answer at Step 219 is Yes, the last 64 NEW VALUES are added and divided by 64 at Step 220, to obtain the AVERAGE value.

The improved technique discussed above may also be implemented using analog circuitry. FIGS. 5 through 8 relate to analog circuitry that may be used to implement this improved technique.

Figure 5:
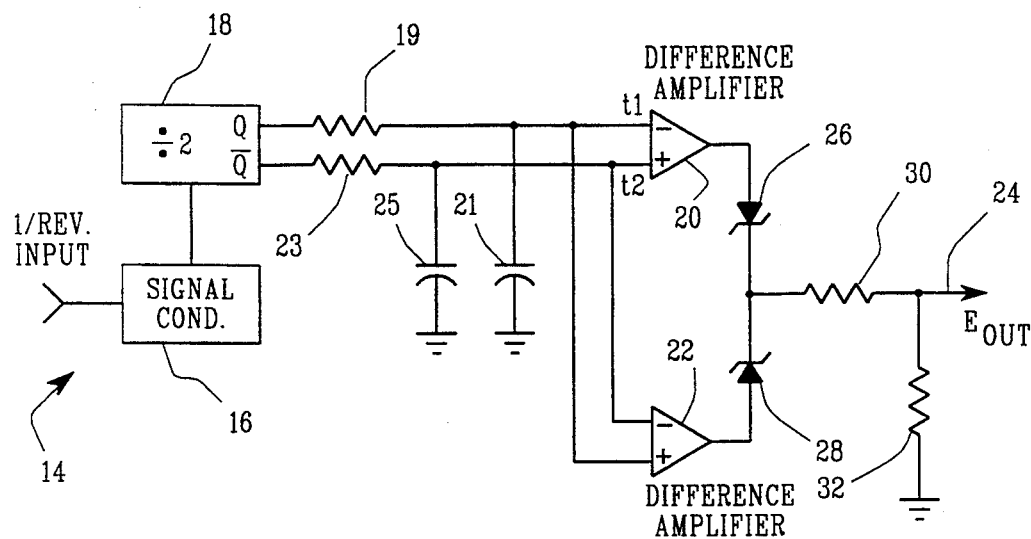
FIG. 5 is a block diagram of an analog embodiment of the present invention that generates a change signal based only upon positive difference values between successive periods of crankshaft revolution.

In the block diagram depicted in FIG. 5, a signal generated once per revolution is input at 14. The signal is input to a signal conditioner circuit 16, whose purpose is to generate a clean, square wave signal. The resultant, conditioned signal is input to a divide-by-two circuit 18, which changes state each time it receives a conditioned signal. The purpose of circuit 18 is to generate a digital signal whose pulse width is proportional to the length of a crankshaft revolution.

Two difference amplifiers 20 and 22 are used in FIG. 5 to insure that only the positive time differences between successive crankshaft revolutions are used to compute the difference value. In FIG. 5, the Q output of circuit 18 is input as signal $t_1$ to the negative input of difference amplifier 20. The $\overline{Q}$ output of circuit 18 is input as signal $t_2$ to the positive input of difference amplifier 20. Also, the Q output of circuit 18 is input to the positive input of amplifier 22, whereas the $\overline{Q}$ output of circuit 18 is input to the negative input of amplifier 22. One of difference amplifiers 20 or 22 will have a zero output, whereas the other of the difference amplifiers will have an output voltage signal on line 24 that is proportional to the difference between the periods of two successive crankshaft revolutions. The non-zero output of difference amplifier 20 or 22 is proportional to the positive difference value between the periods of two successive crankshaft revolutions. Resistor 19 and capacitor 21 provide filtering for the negative input to amplifier 20 and to the positive input of amplifier 22. Resistor 23 and capacitor 25 likewise provide filtering for the positive input of amplifier 20 and the negative input of amplifier 22. Zener diodes 26 and 28 provide an 'or' function, thus providing an output voltage signal through a voltage divider comprised of resistors 30 and 32 regardless of which difference amplifier generates a positive difference value.

Figure 6A:
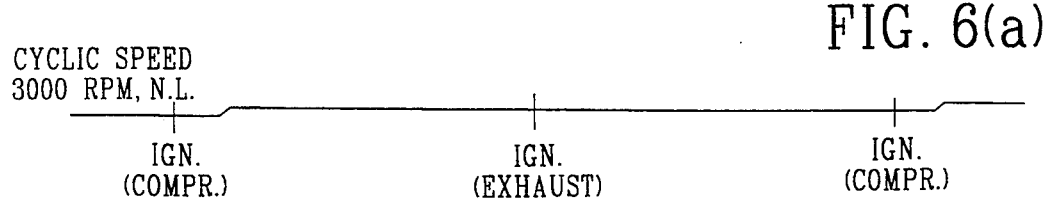
FIGS. 6(a) through 6(e) are timing diagrams related to the schematic diagram of FIG. 5.

The timing diagrams depicted in FIGS. 6(a) through 6(e) relate to the circuit of FIG. 5. FIG. 6(a) depicts the instantaneous speed during a full engine cycle in a no load (NL) condition. As shown in FIG. 6(a), the instantaneous speed of the engine has very little variation when no load is applied to the engine, resulting in a small difference value between successive crankshaft revolution periods.

Figure 6B:
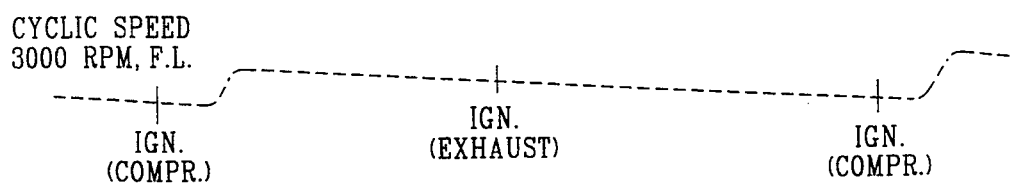

FIG. 6(b) depicts the instantaneous engine speed during a full engine cycle when a full load is applied to the engine. As shown in FIG. 6(b), the instantaneous speed of the engine increases shortly after the ignition pulse is generated during the compression stroke. The speed increases at this point (i.e., the first crankshaft revolution period becomes smaller) because fuel combustion causes the piston to reciprocate faster immediately thereafter. The instantaneous speed then gradually decreases until shortly after the next fuel combustion event occurs.

Figure 6C:
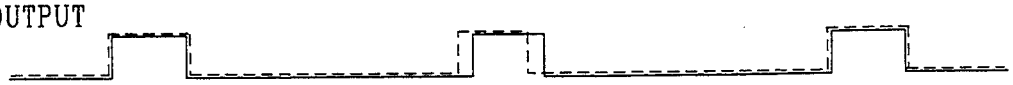

FIG. 6(c) depicts the output of the signal conditioner circuit 16 of FIG. 5. The solid line depicts the output under no load conditions, whereas the dotted line depicts the output under full load conditions. The time between two rising edges of two adjacent rectangular pulses represents a period of a crankshaft revolution.

Figure 6D:
Figure 6E:
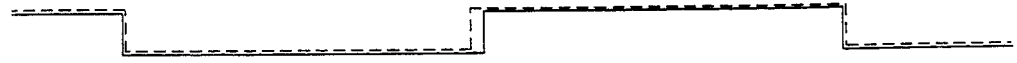

FIG. 6(d) depicts the Q output of the divide-by-two circuitry 18 in FIG. 5. As shown in FIGS. 6(d) and 6(e), the length of the first period; corresponding to $t_1$, is virtually identical to the length of the second period, $t_2$ (FIG. 6(e)), when no load is applied to the engine. As load is applied, the first period ($t_1$) becomes less than the second period ($t_2$), so that the difference value between the first period and the second period is greater under a full load condition.

Figure 7:
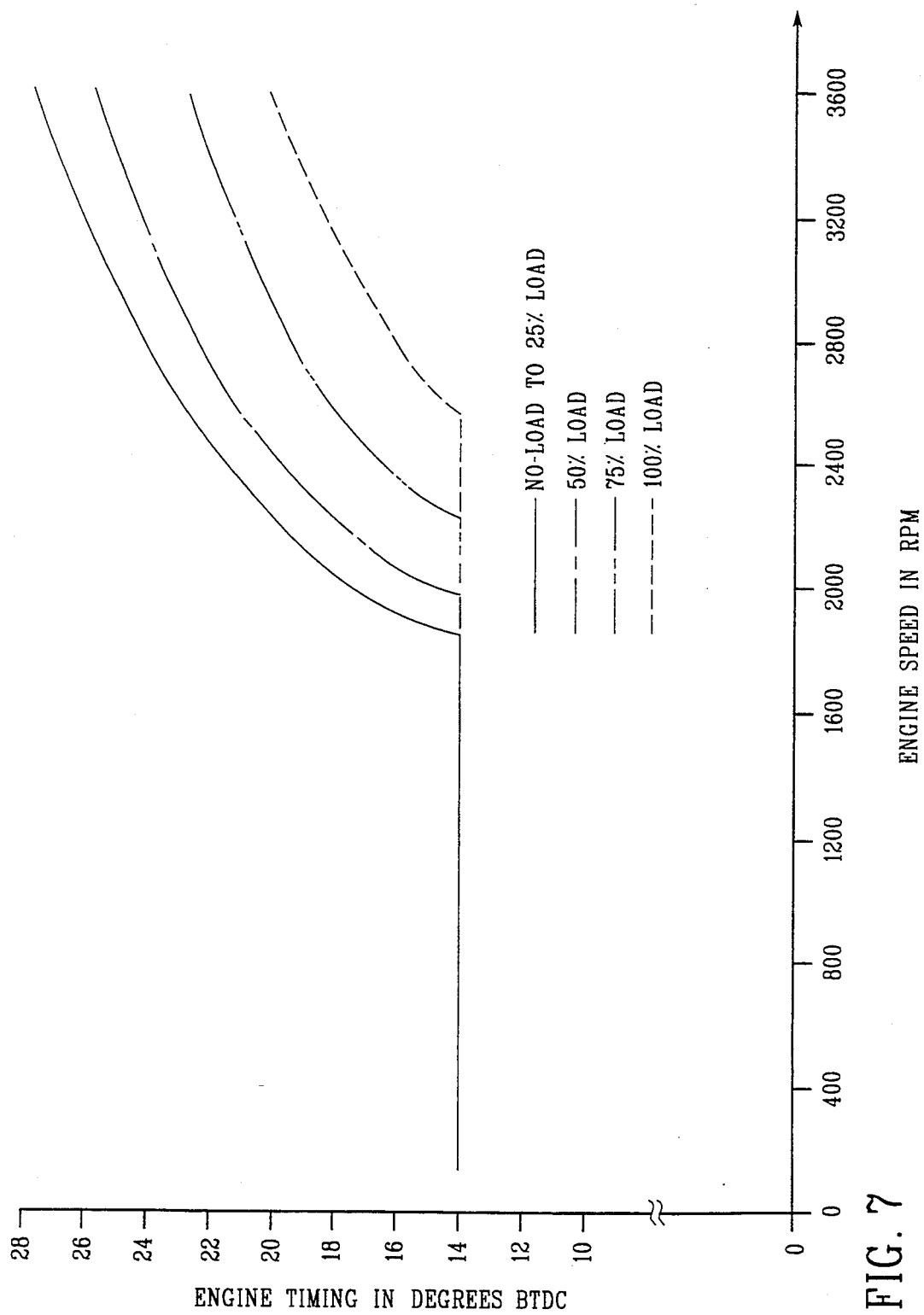
FIG. 7 is a graph of engine timing versus engine speed depicting the change in engine timing as a function of the load being applied to the engine.
Figure 8:
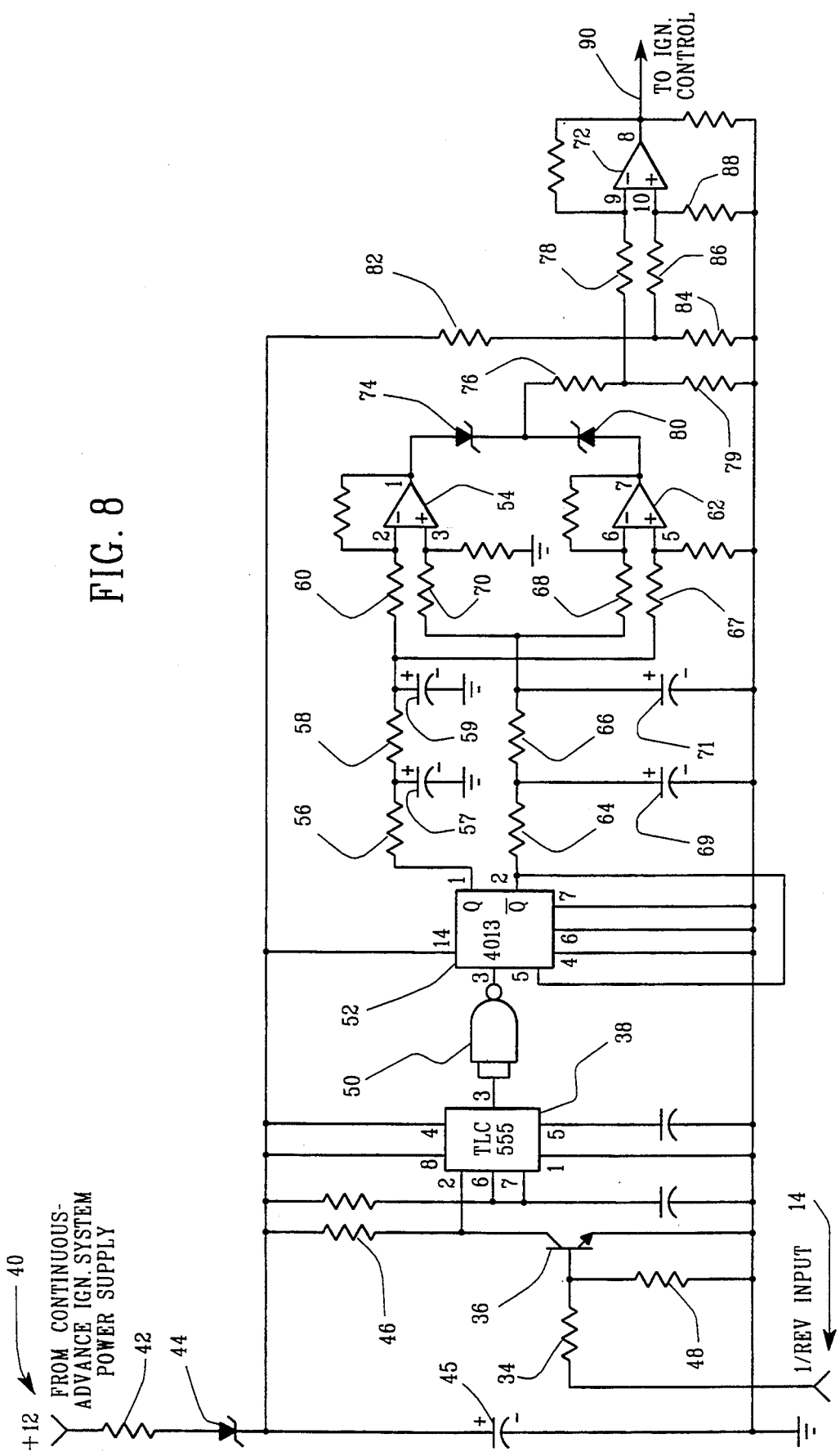
FIG. 8 is a schematic diagram of the full circuit represented by the block diagram in FIG. 5.

FIG. 7 is a graph of engine timing in degrees before top dead center (BTDC) versus engine speed in RPM, using the circuitry depicted in FIGS. 5 and 8. As shown in FIG. 7 ignition timing varies with engine speed and load.

FIG. 8 is a schematic diagram corresponding to the block diagram of FIG. 5. In FIG. 8, the one pulse per revolution signal input at 14 passes through a resistor 34 and turns ON a transistor 36. The turning ON of transistor 36 brings the input at pin 2 of a 555 timer 38 to a low state, thereby starting a timing cycle within the timer. When transistor 36 is OFF, pin 2 is kept in its high state by a signal from a 12 volt power supply 40, which is filtered by resistor 42, zener diode 44 and capacitor 45. The base of transistor 36 is connected to ground through a resistor 48.

After the timing cycle of 555 timer 38 has timed out, the output at pin 3 of timer 38 is input to, and inverted by, a NAND gate 50. The output of NAND gate 50 is input to a divide-by-two integrated circuit 52. The Q output of circuit 52 is connected to the negative input of a difference amplifier 54 through resistor 60 after conditioning by a two-stage RC filter network consisting of resistor 56, capacitor 57, resistor 58, and capacitor 59.

The Q output is also fed to the positive input of difference amplifier 62 through a resistor 67. The $\overline{Q}$ output of circuit 52 is filtered by a two-stage RC filter network consisting of resistor 64, capacitor 69, resistor 66 and capacitor 71. This filtered signal is then applied to the positive input of difference amplifier 54 through resistor 70 and to the negative input of difference amplifier 62 through resistor 68.

The output of difference amplifier 54 is connected to the negative input of an amplifier 72 through zener diode 74 and the voltage-divider consisting of resistors 76 and 79. The output of difference amplifier 62 is also connected to the negative input of amplifier 72 through zener diode 80 and the voltage divider consisting of resistors 76 and 79.

The negative input of amplifier 72 is compared with a reference signal derived from 12 volt power supply 40 and divided by a resistor divider consisting of resistors 82 and 84, and by a resistor divider consisting of resistors 86 and 88. The output of amplifier 72 on line 90 is a control signal that may be used to control or change an operating parameter of the engine.

The purpose of timer 38 in FIG. 8 is to provide a square wave input to the remainder of the logic circuitry. The timing cycle of the 555 timer should be longer than any analog voltage signal input to it at normal engine operating speeds. The timing cycle may also be used to provide a time delay function, when used in conjunction with NAND gate inverter 50.

While several embodiments of the present invention have been shown and described, alternate embodiments will be apparent to those skilled in the art and are within the intended scope of the present invention. Therefore, the invention is to be limited only by the following claims.

We claim:

1. A device that changes an operating parameter of an internal combustion engine, said engine including a revolving crankshaft and said engine igniting fuel in a combustion chamber during a combustion event, said device comprising:
    determining means for determining a first period functionally related to the duration of a first crankshaft revolution during which a combustion event occurs in said combustion chamber, and for determining a second period functionally related to the duration of a second subsequent crankshaft revolution during which no combustion event occurs in said combustion chamber;
    means for generating a difference value functionally related to the difference between said first period and said second period; and
    means for generating a change signal to change said operating parameter of said engine as a function of said difference value.

2. The device of claim 1, wherein said determining means includes an integrated timer circuit.

3. The device of claim 1, wherein said determining means includes a microprocessor.

4. The device of claim 1, wherein said difference value generating means includes at least one difference amplifier.

5. The device of claim 1, wherein said difference value generating means includes a microprocessor.

6. The device of claim 1, further comprising:
    means for generating a reference value; and
    means for comparing said difference value with said reference value to determine whether said change signal generating means should generate a change signal.

7. The device of claim 6, further comprising:
means for changing said reference value.

8. The device of claim 7, wherein said change means includes:
means for storing a plurality of successive difference values; and
means for computing a new reference value using said stored difference values.

9. The device of claim 1, wherein said operating parameter is engine speed.

10. The device of claim 9, wherein said change signal generating means generates a change signal if said difference value is less than said reference value, to thereby decrease said engine speed.

11. The device of claim 9, wherein said change signal generating means generates a change signal if said difference value is greater than said reference value, to thereby increase said engine speed.

12. The device of claim 7, wherein said change means includes at least one manually-operable switch.

13. The device of claim 6, further comprising:
means for generating a second reference value; and
means for generating a second change signal to change said operating parameter of said engine if said difference value is substantially equal to said second reference value.

14. The device of claim 1, wherein said change signal is generated after a predetermined delay period.

15. The device of claim 6, wherein said reference value generating means includes:
sampling means for sampling and storing a difference value as said reference value.

16. The device of claim 15, further comprising:
an ON/OFF switch, said sampling means sampling and storing said difference value after said switch is placed in the ON position.

17. The device of claim 1, wherein said difference value generating means includes:
means for obtaining the absolute value of said difference;
means for generating a difference value as a function of the absolute value of said difference;
means for storing a plurality of difference values; and
means for computing a new difference value using said stored difference values.

18. The device of claim 1, wherein said difference value generating means includes:
means for generating a difference value only when said difference is non-negative.

19. The device of claim 18, wherein said difference value generating means further comprises:
means for storing a plurality of difference values corresponding to said non-negative differences; and
means for computing a new difference value using said stored difference values.

20. A device that generates a change signal to change an operating parameter of an engine, said engine including a revolving crankshaft and said engine igniting fuel in a combustion chamber during a combustion event, said device comprising:
means for determining a plurality of first periods, each of said first periods corresponding to a crankshaft revolution during which a combustion event occurs in said combustion chamber, and for determining a plurality of second periods, each of said second periods corresponding to a crankshaft revolution during which no combustion event occurs in said combustion chamber;
means for determining a plurality of difference values, each of said difference values corresponding to a difference between one of said first periods and one of said second periods;
means for determining the absolute values of said plurality of difference values; and
means for generating a change signal to change said engine operating parameter as a function of said average difference value.

21. The device of claim 20, further comprising:
means for generating a reference value; and
means for comparing said average difference value with said reference value to determine whether said change signal generating means should generate a change signal.

22. The device of claim 21, further comprising:
means for changing said reference value.

23. The device of claim 22, wherein said reference value change means includes at least one manual switch.

24. The device of claim 22, wherein said reference value change means includes:
means for storing said reference value; and
means for replacing said stored reference value with said average difference value.

25. The device of claim 20, wherein said operating parameter is engine speed.

26. A device that generates a change signal to change an operating parameter of an engine, said engine including a revolving crankshaft and said engine igniting fuel in a combustion chamber during a combustion event, said device comprising:
first means for determining a plurality of first periods, each of said first periods corresponding to a crankshaft revolution during which a combustion event occurs in said combustion chamber;
second means for determining a plurality of second periods, each of said second periods corresponding to a crankshaft revolution during which no combustion event occurs in said combustion chamber;
third means for determining a plurality of difference values, each of said difference values corresponding to a difference between one of said first periods and one of said second periods;
fourth means for determining which of said difference values are non-negative;
means for averaging said non-negative difference values to obtain an average difference value; and
means for generating a change signal to change said engine operating parameter as a function of said average difference value.

27. The device of claim 26 wherein said first determining means includes an integrated timer circuit.

28. The device of claim 26, wherein said first determining means includes a microprocessor.

29. The device of claim 26, wherein said fourth determining means includes a difference amplifier.

30. The device of claim 26, further comprising:
means for generating a reference value; and
means for comparing said average difference value with said reference value to determine whether said change signal generating means should generate a change signal.

31. The device of claim 26, further comprising:
means for changing said reference value.

32. The device of claim 31, wherein said reference value change means includes at least one manual switch.

33. The device of claim 31, wherein said reference value change means includes:
means for storing said reference value; and
means for replacing said stored reference value with said average difference value.

* * * * *

UNITED STATES PATENT AND TRADEMARK OFFICE
CERTIFICATE OF CORRECTION

PATENT NO. : 5,445,014
DATED : August 29, 1995
INVENTOR(S) : John A. Fiorenza, II; Richard A. Dykstra; Joseph L. Pfaff; Scott L. Wesenberg; Douglas Shears It is certified that error appears in the above—identified patent and that said Letters Patent is hereby corrected as shown below:

Column 14, line 6, delete the word "and".

Column 14, after line 6, insert the following paragraph --means for averaging said plurality of absolute values to yield an average difference value; and--

Signed and Sealed this

Second Day of April, 1996

Attest:

BRUCE LEHMAN

Attesting Officer     Commissioner of Patents and Trademarks